UNITED STATES PATENT OFFICE.

ARTHUR HEINEMANN, OF SOUTH KENSINGTON, LONDON, ENGLAND.

PRODUCTION OF CAOUTCHOUC FROM ISOPRENE.

1,146,253.

Specification of Letters Patent.

Patented July 13, 1915.

No Drawing.

Application filed June 9, 1911. Serial No. 632,201.

*To all whom it may concern:*

Be it known that I, ARTHUR HEINEMANN, subject of the King of Prussia, residing at 10 Sumner Terrace, Onslow Square, South Kensington, London, S. W., England, have invented new and useful Improvements Relating to the Production of Caoutchouc from Isoprene, of which the following is a specification.

This invention consists in producing caoutchouc or india-rubber from isoprene by the polymerizing action of ordinary or nascent oxygen or alternatively by the action of ozone.

The essential feature of the invention is that the isoprene is first treated with the oxygen or ozone at a relatively low temperature and is afterward heated as a body to a relatively high temperature, the result being that the isoprene becomes viscous and is eventually converted into a substance having the properties of natural india-rubber or caoutchouc.

Referring first to the polymerization of the isoprene by means of oxygen, the invention may be carried out in the following manner: The isoprene is advantageously cooled while it is being treated with the oxygen. As an example of the relative quantities of oxygen and isoprene and the time of treatment, good results may be obtained if 20 liters of oxygen are used for each liter of isoprene and the treatment is spread over a period of six hours. As soon as the isoprene is sufficiently treated it is placed in a closed vessel to prevent escape of vapor and the vessel heated to a temperature of 40°–105° C. for a period of time varying from a few hours to several days. The heating of the vessel is continued until the isoprene is converted into a viscous mass, after which the vessel is allowed to cool and is then opened. The mass is freed from any unconverted liquid by evaporation or the caoutchouc is precipitated by means of alcohol or other method adopted for obtaining the dry product. The product possesses the properties of natural india-rubber.

The exact mechanism of the action of the oxygen upon the isoprene is a matter of theory, and is not here important, it being sufficient to note the results obtained by the procedure herein described. It may perhaps be that the oxygen, a certain amount of which is absorbed in the beginning of the aeration, produces compounds which are unstable and break up into acetic and formic acids and carbon dioxid. The material becomes somewhat acid as a matter of fact.

The isoprene instead of being used by itself, as above described, may be dissolved in a neutral liquid, for instance benzene. The quantity of india-rubber produced will depend on the temperature and the time during which the heating is continued. At a lower temperature than 100° C. only a small quantity of india-rubber is produced but at 100°–105° C. a greater quantity is obtained. If the heating is effected at the higher range of temperature, namely 100°–105° C., for a period of eight days, a yield of approximately fifty per cent. of india-rubber will be obtained. The heating of the oxidized isoprene is not absolutely necessary as the conversion will be effected without heat if sufficient time is allowed. The polymerization of isoprene by means of ozone is effected in the same way as in the case of oxygen. The ozone acts in the same way as oxygen.

As above mentioned either ordinary oxygen or the more active nascent oxygen may be used. The nascent oxygen may be obtained in different ways. For instance it may be produced by the addition to the isoprene of barium peroxid and dilute sulfuric acid, only enough of the latter being used as will be sufficient to liberate the oxygen. Again the nascent oxygen may be obtained from peroxid of hydrogen or by the electrolysis of water.

Having now described my invention what I have invented and desire to secure by Letters Patent of the United States is as follows:—

1. A process for the production of caoutchouc from isoprene, comprising first passing a substantial amount of a substance composed of oxygen through the isoprene while maintaining the latter at a low temperature, and then heating the product for a time sufficient to effect polymerization.

2. A process for the production of caoutchouc from isoprene, comprising first passing a substantial amount of free ozone through the isoprene while maintaining the latter at a low temperature, and then heating the product for a time sufficient to effect polymerization.

3. A process for the production of caoutchouc from isoprene, comprising first passing a substantial amount of a substance composed of oxygen through the isoprene while maintaining the latter at a low temperature, and then heating the product to a temperature of approximately 105° C. for a time sufficient to effect polymerization.

4. A process for the production of caoutchouc from isoprene, comprising first passing a substantial amount of free ozone through the isoprene while maintaining the latter at a low temperature, and then heating the product to a temperature of approximately 105° C. for a time sufficient to effect polymerization.

5. A process for the production of caoutchouc from isoprene which comprises absorbing a substantial amount of a substance composed of oxygen in isoprene at a relatively low temperature and thereafter raising to a high temperature without permitting escape of vapors, heating being continued until the mass becomes viscous.

In testimony whereof I have signed my name to this specification in the presence of two subscribing witnesses.

ARTHUR HEINEMANN.

Witnesses:
ARTHUR F. ENNIS,
H. D. JAMESON.